(12) United States Patent
Kobayashi et al.

(10) Patent No.: US 12,038,541 B2
(45) Date of Patent: Jul. 16, 2024

(54) ULTRASONIC SENSOR

(71) Applicant: DENSO CORPORATION, Kariya (JP)

(72) Inventors: Kensuke Kobayashi, Nisshin (JP); Masayoshi Satake, Nisshin (JP); Dai Kondo, Kariya (JP)

(73) Assignee: DENSO CORPORATION, Kariya (JP)

( * ) Notice: Subject to any disclaimer, the term of this patent is extended or adjusted under 35 U.S.C. 154(b) by 207 days.

(21) Appl. No.: 17/650,206

(22) Filed: Feb. 7, 2022

(65) Prior Publication Data

US 2022/0155429 A1    May 19, 2022

Related U.S. Application Data

(63) Continuation of application No. PCT/JP2020/029539, filed on Jul. 31, 2020.

(30) Foreign Application Priority Data

Aug. 9, 2019   (JP) .................................. 2019-147839

(51) Int. Cl.
  *G01S 7/52*    (2006.01)
  *G01S 7/521*   (2006.01)
  *G01S 15/931*  (2020.01)
  *H04R 17/02*   (2006.01)

(52) U.S. Cl.
  CPC .......... *G01S 7/52004* (2013.01); *G01S 7/521* (2013.01); *G01S 15/931* (2013.01); *H04R 17/02* (2013.01); *G01S 2007/52009* (2013.01)

(58) Field of Classification Search
  CPC .... G01S 7/52004; G01S 7/521; G01S 15/931; G01S 2007/52009; G01S 2015/938; G01S 2015/937; H04R 17/02; H04R 2499/13
  See application file for complete search history.

(56) References Cited

U.S. PATENT DOCUMENTS

| 8,675,449 | B2* | 3/2014 | Mielenz | G01S 7/521 |
| | | | | 367/99 |
| 2014/0346303 | A1* | 11/2014 | Hirakawa | G01S 7/521 |
| | | | | 248/309.1 |

OTHER PUBLICATIONS

U.S. Appl. No. 17/470,309 and its entire file history.

* cited by examiner

*Primary Examiner* — Yuqing Xiao
*Assistant Examiner* — Christopher Richard Walker
(74) *Attorney, Agent, or Firm* — MASCHOFF BRENNAN (57) ABSTRACT

An ultrasonic sensor includes an adhesion sensor including a variable capacitance and a fixed capacitance. The variable capacitance includes a sensor electrode provided on a first surface of a bottom having a microphone installed thereon and a capacitance value thereof changes in accordance with adhesion of foreign matter on the first surface. The fixed capacitance includes a first electrode connected to the sensor electrode, and a second electrode provided on a member different from a microphone housing and disposed facing the first electrode. The adhesion sensor further includes an adhesion detecting section that is connected to the sensor electrode via the fixed capacitance and detects adhesion of foreign matter to the first surface by supplying an alternating-current signal to the fixed capacitance and the variable capacitance.

8 Claims, 10 Drawing Sheets

ULTRASONIC SENSOR

CROSS-REFERENCE TO RELATED APPLICATION

The present application is a continuation application of International Application No. PCT/JP2020/029539, filed on Jul. 31, 2020, which claims priority to Japanese Patent Application No. 2019-147839, filed on Aug. 9, 2019. The contents of these applications are incorporated herein by reference in their entirety.

BACKGROUND

Technical Field

The present disclosure relates to an ultrasonic sensor including a microphone housing that performs ultrasonic vibration.

Background Art

An ultrasonic sensor is installed on a body component such as a bumper of a vehicle, and has a configuration in which a microphone is attached to a bottom (hereinafter, referred to as a vibration portion) of a microphone housing formed of a bottomed cylindrical member. The ultrasonic sensor generates ultrasonic waves by ultrasonically vibrating the vibration portion based on energization of the microphone, and detects an obstacle present in the vicinity of a vehicle by receiving reflected waves of the ultrasonic waves. When adhering matter is present on a vibration surface of the microphone housing, such an ultrasonic sensor changes its vibration properties due to the adhering matter and cannot perform accurate obstacle detection.

SUMMARY

In the present disclosure, provided is an ultrasonic sensor as the following.

The ultrasonic sensor includes an adhesion sensor, the adhesion sensor includes a variable capacitance, a fixed capacitance and an adhesion detecting section. The variable capacitance includes a sensor electrode provided on a first surface of a bottom having a microphone installed thereon and a capacitance value thereof changes in accordance with adhesion of foreign matter on the first surface. The fixed capacitance includes a first electrode connected to the sensor electrode, and a second electrode provided on a member different from a microphone housing and disposed facing the first electrode. The adhesion detecting section is connected to the sensor electrode via the fixed capacitance and detects adhesion of foreign matter to the first surface by supplying an alternating-current signal to the fixed capacitance and the variable capacitance.

DETAILED DESCRIPTION OF THE PREFERRED EMBODIMENTS

Therefore, PTL 1 proposes a technique of concentrically disposing two ring electrodes on a vibration surface of a microphone housing and detecting adhering matter based on a change in electrostatic capacitance between the two ring electrodes, which is caused by the adhering matter.

[PTL 1] U.S. Pat. No. 8,675,449 B

When two ring electrodes are disposed on a vibration surface of a microphone housing as in PTL 1, each of the ring electrodes is connected to a circuit board of an ultrasonic sensor by a wiring line, and electrical connection between the two ring electrodes and the circuit board is thus achieved through the wiring lines. For example, the ultrasonic sensor is structured by surrounding, with a cushion, a microphone housing having a bottomed cylindrical shape, and fitting the cushion and the microphone housing into a sensor case provided with a circuit board. The ultrasonic sensor having such a structure is configured that, for example, the wiring lines pass through between the microphone housing and the cushion to thereby achieve direct connection between the two ring electrodes and the circuit board.

The configuration of directly connecting the two ring electrodes to the circuit board by the wiring lines, however, causes a variation in vibration properties of the vibration surface and can thus inhibit accurate obstacle detection. Specifically, when the vibration of the vibration surface is propagated through the wiring lines, the variation in vibration properties of the microphone is more greatly affected as the mass of a part to which the wiring lines are connected is increased. Therefore, when the ultrasonic sensor has a configuration in which two ring electrodes are directly connected to a circuit board by the wiring lines, the wiring lines are directly connected to the circuit board having a large mass, causes a variation in vibration properties of the microphone, and thus affects the obstacle detection.

In addition, such an ultrasonic sensor also causes a problem of decreasing the durability, for example, by inducing cracks at a connection portion, e.g., a soldered portion, between the circuit board and the wiring lines because the vibration of the microphone housing is directly propagated to the circuit board through the wiring lines.

An object of the present disclosure is to provide an ultrasonic sensor capable of suppressing the variation in vibration properties of a vibration surface of a microphone housing and improving the durability at a connection portion between a wiring line and a circuit board.

An ultrasonic sensor according to one aspect of the present disclosure includes: a microphone that is formed of a piezoelectric vibration element, the piezoelectric vibration element converting an electrical signal into vibration and converting vibration into an electrical signal; a microphone housing that has a bottomed tubular shape and includes a bottom including a first surface and a side wall, and houses the microphone, the bottom constituting a vibration portion having the microphone installed thereon; and an adhesion sensor that detects adhesion of foreign matter to the first surface. The adhesion sensor includes: a variable capacitance that includes a sensor electrode provided on the first surface of the bottom and whose capacitance value changes in accordance with adhesion of foreign matter on the first surface; a fixed capacitance that includes a first electrode connected to the sensor electrode, and a second electrode provided on a member different from the microphone housing and disposed facing the first electrode; and an adhesion detecting section that is connected to the sensor electrode via the fixed capacitance and detects adhesion of foreign matter to the first surface by supplying an alternating-current signal to the fixed capacitance and the variable capacitance.

In a circuit configuration of the adhesion sensor, the first electrode is thus electrically isolated from the second electrode. Therefore, wiring connected to the adhesion detecting section is disconnected from the first electrode. Accordingly, when the vibration portion is ultrasonically vibrated, the vibration is propagated to the wiring only via the member different from the microphone housing. This configuration can prevent a phenomenon in which the vibration is directly propagated from the first electrode to the wiring and is then propagated to the adhesion detecting section, and makes it possible to suppress the variation in vibration properties of the microphone. It is thus possible to suppress inaccurate obstacle detection caused by the variation in vibration properties of the microphone.

The reference signs in parentheses assigned to constituent parts and the like represent examples of correspondence relationship between the constituent parts and the like and specific constituent parts and the like described in embodiments below.

Hereinafter, embodiments of the present disclosure are described based on the drawings. The embodiments are described below, with identical symbols assigned to parts that are identical or equivalent to each other.

First Embodiment

Figure 1:
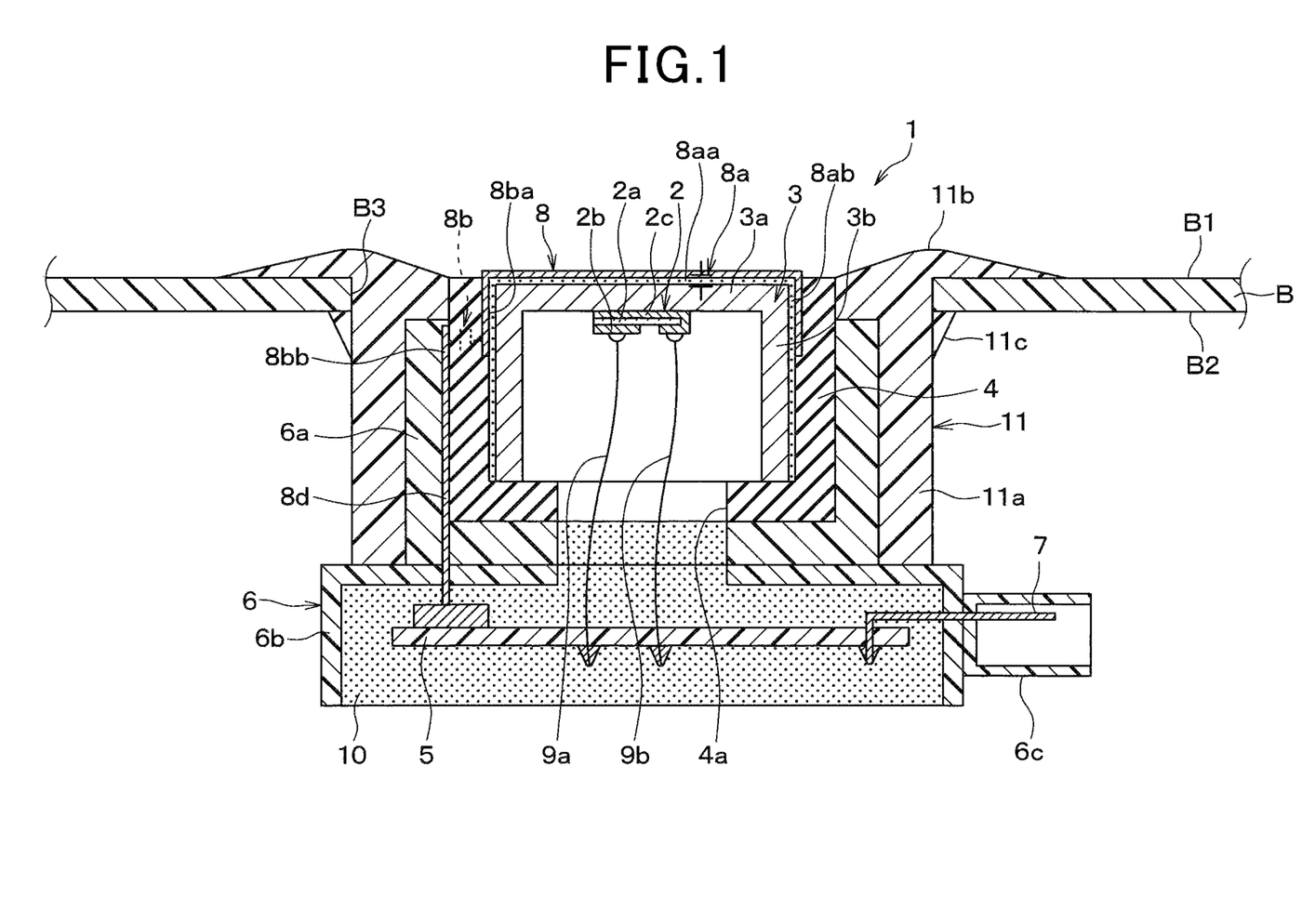
FIG. 1 is a sectional view of an ultrasonic sensor according to a first embodiment.

The structure of an ultrasonic sensor 1 according to a first embodiment will be described with reference to FIGS. 1 to 4. As illustrated in FIG. 1, the ultrasonic sensor 1 according to the present embodiment is installed on a vehicle by being mounted on an object, for example, a bumper B that is a plate-shaped component of a vehicle body. The bumper B includes a bumper outer surface B1 that constitutes an outer front surface of the vehicle, and a bumper inner surface B2 that is a rear surface thereof. An installation hole B3, which is a through hole for mounting the ultrasonic sensor 1, is formed in the bumper B.

The ultrasonic sensor 1 includes a microphone 2, a microphone housing 3, a cushion 4, a circuit board 5, a sensor case 6, a sensor connector 7, an adhesion sensor 8, and the like, and is mounted on the bumper B via a mounting component 11.

The microphone 2 constitutes an ultrasonic transducer serving as a sound collecting unit and a sound emitting unit in the ultrasonic sensor 1 by converting an electrical signal into vibration and converting vibration into an electrical signal, and is formed of a piezoelectric vibration element. The microphone 2 is configured to include a piezoelectric film 2a such as made from lead zirconate titanate (hereinafter, referred to as PZT), a positive terminal 2b connected to a first surface of the piezoelectric film 2a, and a negative terminal 2c connected to a second surface of the piezoelectric film 2a, with the negative terminal 2c side attached to the microphone housing 3.

Specifically, a first surface of the microphone 2 on which the positive terminal 2b is disposed is directed opposite to the attachment surface to the microphone housing 3. The negative terminal 2c has a folded configuration as a result of being formed on the second surface of the piezoelectric film 2a while reaching the first surface from a side surface of the piezoelectric film 2a. Therefore, the negative terminal 2c is configured to be separated and thus insulated from the positive terminal 2b, while also formed on the first surface on which the positive terminal 2b is also formed. Accordingly, even though the negative terminal 2c on a second surface of the microphone 2 is attached to the microphone housing 3, electrical connection can be established on the first surface of the microphone 2. Further, the positive terminal 2b is electrically connected through a positive wiring line 9a to a positive electrode pattern (not illustrated) provided on the circuit board 5, and the negative terminal 2c is electrically connected through a negative wiring line 9b to a negative electrode pattern (not illustrated) provided on the circuit board 5.

With such a configuration, the microphone 2 can be vibrated by applying thereto a voltage serving as a drive signal, that is, by applying a rectangular-wave voltage to the positive terminal 2b and thus repeatedly generating a potential difference between the positive terminal 2b and the negative terminal 2c. In addition, when displaced based on external vibration, the microphone 2 can generate, as output, an electromotive force corresponding to the displacement. The application of the drive signal to the microphone 2 and the output of the electromotive force from the microphone 2 are performed through the positive wiring line 9a and the negative wiring line 9b which connect the microphone 2 to the circuit board 5.

In the present embodiment, the microphone 2 is attached to the microphone housing 3 formed of a conductor, with a conductive adhesive or the like interposed therebetween. Therefore, the negative terminal 2c of the microphone 2 is electrically connected to the microphone housing 3, and the microphone housing 3 as well as the negative terminal 2c is connected to a ground potential point of the circuit board 5. Here, the microphone housing 3 is configured to be connected to the ground potential point via the negative terminal 2c and the negative wiring line 9b. However, without the electrical connection between the microphone housing 3 and the negative terminal 2c, the microphone housing 3 may be configured to be directly connected to a ground wiring line and connected to the ground potential point through the ground wiring line.

The microphone housing 3 plays a role of outputting, as ultrasonic waves, vibration generated by the microphone 2, and propagating external vibration to the microphone 2. When formed of a conductor as in the present embodiment, the microphone housing 3 also plays a role of a shield against noise. The microphone housing 3 is formed of a bottomed cylindrical member including a bottom 3a and a side wall 3b, and houses the microphone 2, with an interior of the microphone housing 3 serving as a housing space, and the microphone 2 attached to a central portion of the bottom 3a. The microphone housing 3 is disposed, with the bottom 3a side directed to the bumper outer surface B1, and with the side wall 3b side, in other words, an opening side directed to the bumper inner surface B2.

Figure 2:
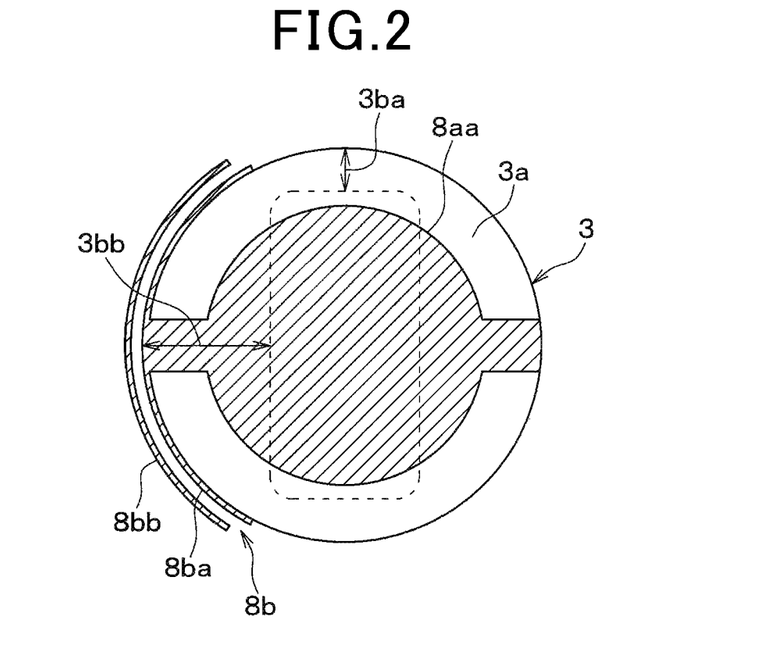
FIG. 2 is a diagram illustrating an electrode arrangement provided in an adhesion sensor, viewed from a direction normal to a surface of a bottom of a microphone housing.

As illustrated by the dashed line in FIG. 2, the housing space of the microphone housing 3 has a rectangular shape with the four corners thereof rounded, when viewed from a direction normal to a first surface of the bottom 3a. Therefore, the side wall 3b of the microphone housing 3 includes a thin portion 3ba at a site corresponding to a short side and a thick portion 3bb at a site corresponding to a long side of the rectangular shape formed by the housing space.

The microphone housing 3 configured in the aforementioned manner transmits ultrasonic waves by making the bottom 3a serve as a vibration portion. Specifically, when the microphone 2 is vibrated based on application thereto of a voltage serving as a drive signal, the bottom 3a is also vibrated accordingly. Based on these behaviors, the bottom 3a of the microphone housing 3 is ultrasonically vibrated and transmits ultrasonic waves along, as a directional axis, a direction normal to the first surface of the bottom 3a, the first surface of the bottom 3a being the exposed surface of the bottom 3a.

Further, when reflected waves of the ultrasonic waves transmitted are returned to the microphone housing 3, the bottom 3a is vibrated accordingly and thus propagates the vibration to the microphone 2 installed on the bottom 3a. The propagation of the vibration makes the microphone 2 generate, as output thereof, an electromotive force corresponding to the vibration propagated, and based on this electromotive force, the ultrasonic sensor 1 can detect reception of the reflected waves.

As described above, in the present embodiment, the microphone housing 3 is formed of a conductor. As a conductor material, for example, aluminum, a conductive polymer, or a material obtained by solidifying a metal filler with a resin can be used. The microphone housing 3 is electrically connected through the negative terminal 2c and the negative wiring line 9b to a GND (ground) pattern (not illustrated) which serves as the ground potential point of the circuit board 5.

Although not illustrated here, the interior of the microphone housing 3 is filled with a vibration-insulating material such as silicone rubber.

The cushion 4 includes a cylindrical portion in which a hollow is formed, the hollow having the microphone housing 3 fitted thereinto. In the present embodiment, the cushion 4 has a bottomed cylindrical shape. The microphone housing 3 together with the microphone 2 and the like are housed in the hollow of the cushion 4. The cushion 4 serves as a buffer member made from an elastic material, and suppresses transmission of vibration between the microphone housing 3 and the bumper B or the sensor case 6. The cushion 4 is made from an insulating elastic material such as silicone rubber. A through hole 4a is formed on a bottom of the cushion 4, and the interior of the microphone housing 3 is open through the through hole 4a toward the circuit board 5 side.

The circuit board 5 is provided with components that constitute a sensor circuit in the ultrasonic sensor 1. The sensor circuit is formed by electrically connecting the microphone 2 and the microphone housing 3 to the circuit board 5 via the wiring lines 9a and 9b, and mounting electronic components (not illustrated in FIG. 1) on the circuit board 5.

Figure 3:
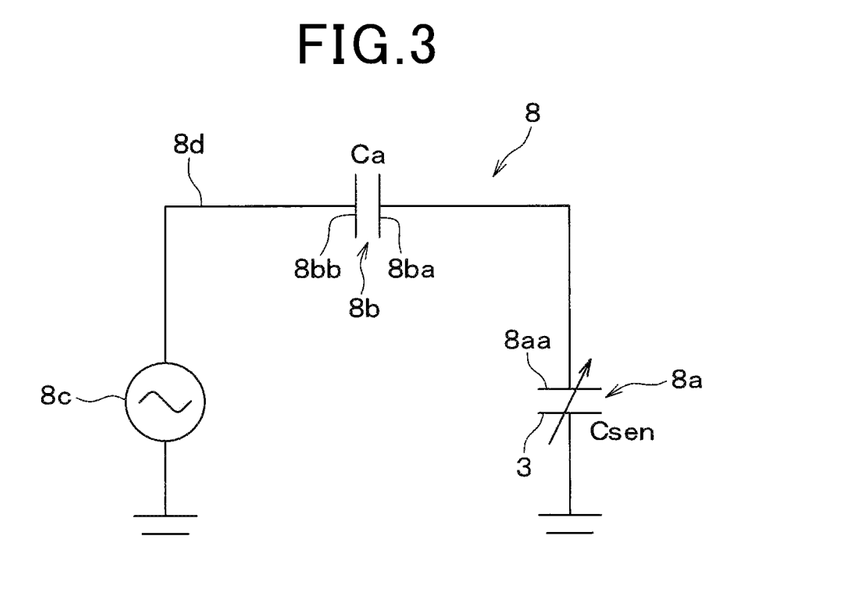
FIG. 3 is a circuit diagram of the adhesion sensor.

Specifically, the sensor circuit is configured to include, in addition to the microphone 2, a transmitting section, a receiving section, a control section, an adhesion detecting section 8c illustrated in FIG. 3, and the like. Thus, electronic components constituting the transmitting section, the receiving section, the control section, and the adhesion detecting section 8c are mounted on the circuit board 5. This sensor circuit performs obstacle detection and adhesion detection of foreign matter to the vibration portion of the microphone housing 3.

The transmitting section applies an ultrasonic-wave-drive voltage as input of an electrical signal to the microphone 2 based on a control signal from the control section. This application causes the microphone 2 and the bottom 3a of the microphone housing 3 to be vibrated, and ultrasonic waves are thus transmitted. The receiving section is formed of, for example, an amplifier that performs differential amplification, and converts into an electrical signal the vibration propagated to the microphone 2 through the microphone housing 3 during reception. The control section controls the transmission of ultrasonic waves from the transmitting section, and the reception of reflected waves by the receiving section. The adhesion detecting section 8c performs adhesion detection of foreign matter, and constitutes a part of the adhesion sensor 8 provided as a part of the sensor circuit. The detail of the adhesion detecting section 8c and the adhesion detection of foreign matter are described later. Here, the adhesion detecting section 8c is illustrated as a constituent part other than the control section, but may be configured to be provided in the control section.

When an application is activated, such as an automated drive application that requires obstacle detection during, for example, vehicle traveling, the sensor circuit configured in the aforementioned manner receives a command from the application and performs obstacle detection. That is, when the command is received from the application, the control section controls the transmitting section to apply a predetermined voltage to the microphone 2 and thus transmit ultrasonic waves. Meanwhile, when these ultrasonic waves are reflected from an obstacle and resultant reflected waves are returned, vibration based on the reflected waves is converted into an electrical signal by the microphone 2, and the electrical signal is received by the receiving section. Therefore, the control section performs obstacle detection such as deriving the distance from the vehicle to the obstacle based on a time interval between the timing of transmitting the ultrasonic waves from the transmitting section and the timing of receiving the reflected waves by the receiving section, and transmits the detection result to the application.

Here, the control section configured to be provided on the circuit board 5 is described, but may be configured to be provided outside the ultrasonic sensor. The control section may be, for example, an electronic control unit (hereinafter, referred to as an ECU) provided outside the ultrasonic sensor and configured to execute an application that requires obstacle detection, or an ECU that controls the ultrasonic sensor based on a command from the application. Examples of the ECU that controls the ultrasonic sensor include a sonar ECU. When the control section is provided outside the ultrasonic sensor, the circuit board 5 is configured to be provided with an interface (hereinafter, referred to as an I/F) for communicating with the control section. Inputting a drive signal from the control section to the circuit board 5 through the I/F drives the transmitting section, the receiving section, and the adhesion detecting section 8c, and a reception result at the receiving section and a detection result at the adhesion detecting section 8c are transmitted to the control section.

The sensor case 6 is a hollow member that constitutes a casing of the ultrasonic sensor 1, and is integrally formed of a hard insulating synthetic resin such as polybutylene terephthalate.

Specifically, the sensor case 6 is configured to include a cylindrical portion 6a corresponding to a tubular portion, a housing portion 6b having a substantially rectangular parallelepiped shape, and a connector case 6c. An interior of the cylindrical portion 6a is in communication with a hollow of the housing portion 6b, the microphone housing 3 having the microphone 2 attached thereto and the cushion 4 are fixed in the cylindrical portion 6a, and the wiring lines 9a and 9b are led out through the through hole 4a of the cushion 4 to the housing portion 6b side. The circuit board 5 is disposed in the hollow of the housing portion 6b, and a first end of the sensor connector 7 is led into the hollow. The circuit board 5 is electrically connected to the wiring lines 9a and 9b in the housing portion 6b, and is also electrically connected to the first end of the sensor connector 7. The surface of the housing portion 6b opposite to the cylindrical portion 6a is open, and a moisture-proof member 10 is provided so as to fill the hollow of the housing portion 6b from the open portion.

The connector case 6c is provided at one end of the sensor case 6, and a second end of the sensor connector 7 is exposed from the connector case 6c.

The sensor connector 7 establishes electrical connection between the ultrasonic sensor 1 and the exterior. Although only one line is illustrated in the drawing, a plurality of lines are provided, such as for voltage application, GND connection, and output. The first end of the sensor connector 7 is led into the housing portion 6b of the sensor case 6 and connected to the circuit board 5, and the second end is exposed from the connector case 6c. Further, the connector case 6c is connected to an external connector (not illustrated) and thereby allows the second end of the sensor connector 7 exposed from the connector case 6c to be connected to a terminal provided in the external connector to establish electrical connection between the ultrasonic sensor 1 and the exterior.

The adhesion sensor 8 detects adhesion of foreign matter, such as snow, to the vibration portion. The adhesion sensor 8 has a circuit configuration illustrated in FIG. 3, and is configured to include a variable capacitance 8a, a fixed capacitance 8b, the adhesion detecting section 8c, wiring 8d, and the like.

Figure 4:
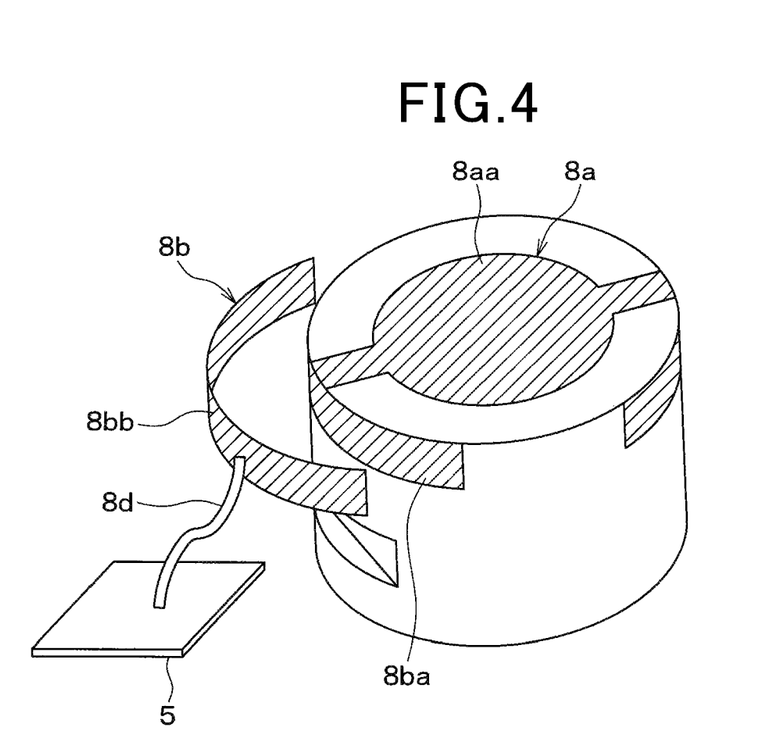
FIG. 4 is a perspective view of the electrode arrangement and a wiring-line arrangement provided in the adhesion sensor.

When the microphone housing 3 is formed of a conductor as in the present embodiment, the variable capacitance 8a is formed by a sensor electrode 8aa illustrated in FIGS. 1, 2, and 4, a non-conductive film 8ab illustrated in FIG. 1 and formed so as to cover a surface of the microphone housing 3, and the microphone housing 3. The sensor electrode 8aa is formed on a surface of the non-conductive film 8ab on the first surface of the bottom 3a in the microphone housing 3. The sensor electrode 8aa can have any shape. In the present embodiment, the sensor electrode 8aa has a circular shape and is disposed concentrically to the center of the bottom 3a in an inner peripheral portion of the bottom 3a. The non-conductive film 8ab is formed of, for example, an insulating film or a dielectric film. The non-conductive film 8ab at least electrically isolates the sensor electrode 8aa from the microphone housing 3 to form a capacitance therebetween. In the present embodiment, the non-conductive film 8ab is formed so as to cover all the external surfaces of the bottom and the side wall 3b of the microphone housing 3. The variable capacitance 8a is configured to change an electrostatic capacitance value thereof when foreign matter such as snow adheres to the sensor electrode 8aa or its surroundings, in comparison with cases where no adhesion occurs.

Here, the variable capacitance 8a is formed by the sensor electrode 8aa and the microphone housing 3, but can be configured to include two sensor electrodes 8aa, the other one of the two sensor electrodes 8aa being formed on a surface of the non-conductive film 8ab.

The fixed capacitance 8b is configured to include a first electrode 8ba and a second electrode 8bb. The first electrode 8ba is connected to the sensor electrode 8aa, constitutes one of the electrodes in the fixed capacitance 8b, and is disposed facing the second electrode 8bb. In the present embodiment, the first electrode 8ba is disposed on the side wall 3b of the microphone housing 3, with the non-conductive film 8ab interposed therebetween, and is disposed circularly along the peripheral direction of the side wall 3b.

Here, as illustrated in FIG. 4, two first electrodes 8ba are disposed symmetrically on both sides of the sensor electrode 8aa in the center. This disposition is employed in consideration of attachment of the microphone housing 3, and only either one of the first electrodes 8ba has to be disposed facing the second electrode 8bb. In detail, each of the first electrodes 8ba is disposed at a site corresponding to the thick portion 3bb of the side wall 3b, and is not disposed at a site corresponding to the thin portion 3ba. The thin portion 3ba of the microphone housing 3 particularly affects vibration of the vibration portion, and disposing the first electrodes 8ba at sites except for the thin portion 3ba makes it possible to suppress the variation in vibration properties caused by providing the first electrodes 8ba.

The second electrode 8bb is disposed facing one of the first electrodes 8ba at a predetermined distance from the first electrode 8ba and capacitively coupled with the first electrode 8ba to form the fixed capacitance 8b and thereby establish circuit connection of the adhesion sensor 8. Here, the second electrode 8bb is disposed between the cushion 4 and the cylindrical portion 6a of the sensor case 6, and disposed circularly along the peripheral direction of an outer peripheral surface of the cushion 4. The second electrode 8bb is preferably disposed so as to entirely face the first electrode 8ba, but may be disposed partially facing the first electrode 8ba, or may be disposed partially facing both the first electrodes 8ba disposed on both sides of the sensor electrode 8aa.

The adhesion detecting section 8c is provided on the circuit board 5 and serves as a part of the sensor circuit. As illustrated in FIG. 3, in performing adhesion detection, the adhesion detecting section 8c supplies an alternating-current signal serving as sensing current to a current path passing through the fixed capacitance 8b and the variable capacitance 8a, calculates capacitance values of the fixed capacitance 8b and the variable capacitance 8a, and thereby detects the presence or absence of adhesion of foreign matter. The fixed capacitance 8b formed between the first electrode 8ba and the second electrode 8bb is an electrostatic capacitive coupling and therefore enables transmission of the alternating-current signal, or electric power.

Specifically, as illustrated in FIG. 3, when the capacitance value of the fixed capacitance 8b is defined as Ca and the capacitance value of the variable capacitance 8a as Csen, the capacitance value Ca exhibits a constant value and the capacitance value Csen exhibits a variable value in accordance with the state of adhesion of foreign matter. The capacitance value Ca and the capacitance value Csen in the state of no adhesion of foreign matter can be identified by measuring with a measuring instrument in advance after production of the ultrasonic sensor. Therefore, when measuring a total capacitance value Call of the circuit supplied with the sensing current, the adhesion detecting section 8c can calculate the capacitance value Csen of the variable capacitance 8a from the total capacitance value Call and the capacitance value Ca of the fixed capacitance 8b based on the following formula.

$$1/Call=(1/Ca)+(1/Csen) \qquad \text{(Math. 1)}$$

The capacitance value Csen calculated above is a value in accordance with the state of adhesion of foreign matter to the vibration portion, and therefore it is possible for the adhesion detecting section 8c to detect adhesion of foreign matter based on the capacitance value Csen. Even without the calculation of the capacitance value Csen, the adhesion detecting section 8c may detect adhesion of foreign matter based on the total capacitance value Call that varies along with the change of the capacitance value Csen.

The wiring 8d electrically connects the second electrode 8bb to the circuit board 5. In the present embodiment, the wiring 8d passes through between the cushion 4 and the cylindrical portion 6a, and is connected to the circuit board 5. The wiring 8d is electrically connected to the second electrode 8bb, but is disconnected from the first electrode 8ba. That is, the wiring line leading to the first electrode 8ba is not directly connected to the circuit board 5 having a large mass. Therefore, even when the vibration portion is ultrasonically vibrated, the vibration is propagated to the wiring 8d only via the cushion 4. This configuration can prevent a phenomenon in which the vibration is directly propagated from the first electrode 8ba to the wiring 8d and is then propagated to the circuit board 5, and makes it possible to suppress the variation in vibration properties of the microphone 2. It is thus possible to suppress inaccurate obstacle detection caused by the variation in vibration properties of the microphone 2.

In addition, this configuration that does not allow the vibration to be directly propagated to the circuit board 5 can make cracks less likely to be generated at a connection portion, e.g., a soldered portion, between the circuit board 5 and the wiring 8d, and thus makes it possible to improve the durability.

A configuration in which the wiring 8d is sandwiched between the cushion 4 and the microphone housing 3 allows constraint force to be generated between the microphone housing 3 and the cushion 4 due to sandwiching the wiring 8d, when the wiring 8d is thick or is sandwiched widely. Due to the influence of the constraint force, the vibration properties of the vibration portion can be varied. In the present embodiment, however, the wiring 8d is disposed on an exterior of the cushion 4, and disposed between the cushion 4 and the microphone housing 3 is only the second electrode 8bb that is thin. Therefore, it is possible to further suppress the variation in vibration properties of the vibration portion.

The mounting component 11 constitutes a retainer that firmly fixes the ultrasonic sensor 1 to the bumper B, and a design bezel exposed on the bumper outer surface B1, and is made from a resin or the like. In the present embodiment, the mounting component 11 is configured to include a cylindrical portion 11a, a flange 11b, and a stopper 11c.

The cylindrical portion 11a is a part into which the cylindrical portion 6a of the sensor case 6, the microphone housing 3, and the like are fitted. By fitting the cylindrical portion 6a, the microphone housing 3, and the like into a hollow of the cylindrical portion 11a, the ultrasonic sensor 1 is held by the mounting component 11. The flange 11b is disposed at one end of the cylindrical portion 11a, and extends radially outward from the cylindrical portion 11a. One external surface of the flange 11b constitutes the design bezel exposed from the bumper outer surface B1. The stopper 11c is formed at a predetermined distance from the flange 11b, on a side surface of the cylindrical portion 11a. A resin portion of the bumper B is sandwiched between the stopper 11c and one internal surface of the flange 11b to make the mounting component 11 firmly fixed to the bumper B and the ultrasonic sensor 1 thus mounted on the bumper B.

The ultrasonic sensor 1 according to the present embodiment is, as described above, configured and mounted on the bumper B via the mounting component 11. For example, when a command from an application that requires obstacle detection is input to the circuit board 5, the ultrasonic sensor 1 configured in the aforementioned manner performs obstacle detection as described above by allowing the control section to control the transmitting section to transmit ultrasonic waves, and allowing the receiving section to receive reflected waves of the ultrasonic waves. In addition, at the timing when no obstacle detection is performed by the ultrasonic sensor 1, that is, when the microphone 2 is not ultrasonically vibrated, for example, when an activation switch such as an ignition switch of a vehicle is turned on, the adhesion sensor 8 performs adhesion detection of foreign matter.

In this case, the adhesion sensor 8 of the ultrasonic sensor according to the present embodiment has a circuit configuration in which the first electrode 8ba is electrically isolated from the second electrode 8bb, and the wiring 8d connecting the second electrode 8bb to the adhesion detecting section 8c provided on the circuit board 5 is disconnected from the first electrode 8ba. Therefore, even when the vibration portion is ultrasonically vibrated, the vibration is propagated to the wiring 8d only via the cushion 4. This configuration can prevent a phenomenon in which the vibration is directly propagated from the first electrode 8ba to the wiring 8d and is then propagated to the circuit board 5, and makes it possible to suppress the variation in vibration properties of the microphone 2. It is thus possible to suppress inaccurate obstacle detection caused by the variation in vibration properties of the microphone 2.

Figure 5:
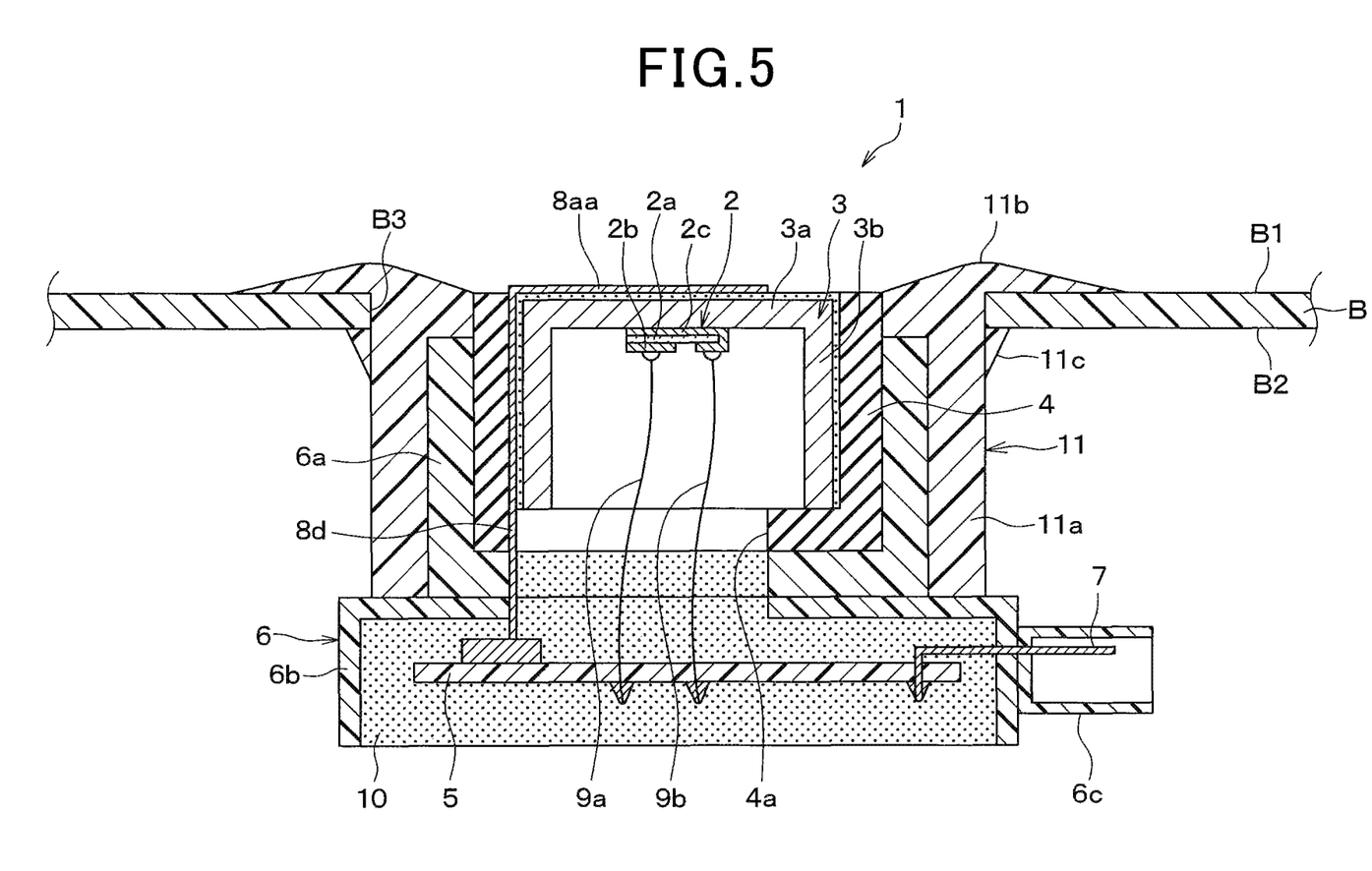
FIG. 5 is a sectional view of an ultrasonic sensor having a comparative structure.
Figure 6:
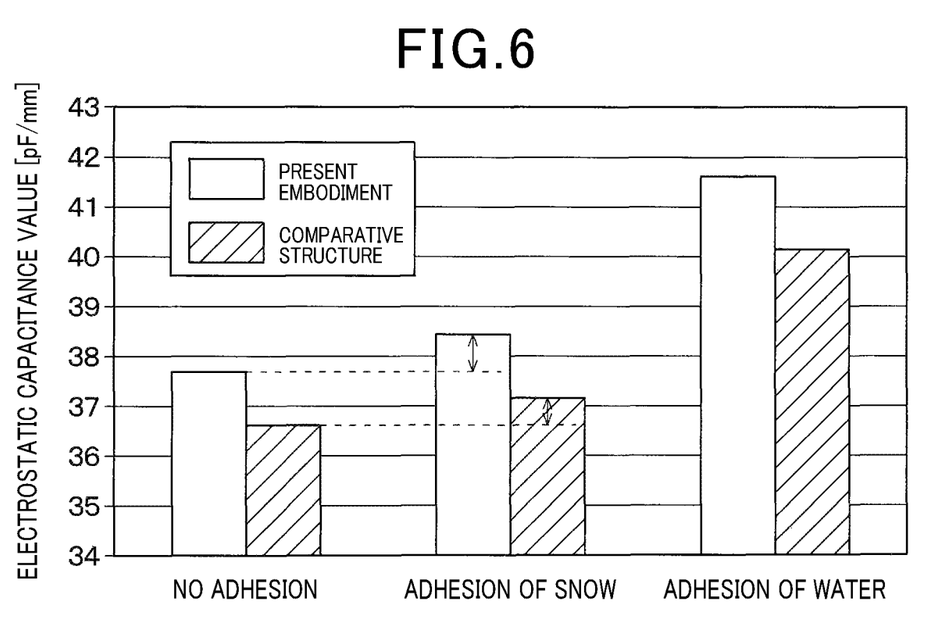
FIG. 6 is a graph illustrating a result of detecting the change in electrostatic capacitance of the ultrasonic sensor according to the first embodiment and the ultrasonic sensor having the comparative structure, in accordance with the presence or absence of adhering matter and the type of adhering matter.

As an example of effect confirmation, the structure of the present embodiment and a comparative structure illustrated in FIG. 5, in which a wiring 8d is sandwiched between a cushion 4 and a microphone housing 3, are checked for the change in capacitance value in the cases of no adhesion of foreign matter, adhesion of snow as foreign matter, and adhesion of water. FIG. 6 shows the result of the check. The capacitance value referred to here corresponds to the total capacitance value Call measured by the adhesion detecting section 8c, and in the comparative structure illustrated in FIG. 5, corresponds to the capacitance value of only the variable capacitance 8a referred to in the present embodiment.

As illustrated in this graph, when foreign matter adheres around the sensor electrode 8aa, both the structure of the present embodiment and the comparative structure illustrated in FIG. 5 exhibit a change in electrostatic capacitance in accordance with the type and the area of the adhering matter. Specifically, the capacitance value is greater in the case of adhesion of foreign matter than in the case of no adhesion. Further, in the case of adhesion of snow having a small adhesion area, the value of the change in capacitance is small, whereas in the case of adhesion of water having a large adhesion area, the value of the change in capacitance is great. Therefore, based on the total capacitance value Call or based on the capacitance value Csen calculable from the total capacitance value Call, it is possible to detect adhesion of foreign matter and also specify the type of adhering matter based on the absolute value or the amount of change of the capacitance value.

Second Embodiment

A second embodiment will be described. In the present embodiment, the configuration and the like of the fixed capacitance 8*b* are changed with respect to those of the first embodiment, but other features are the same as in the first embodiment. Therefore, only the parts different from those of the first embodiment are described.

Figure 7:
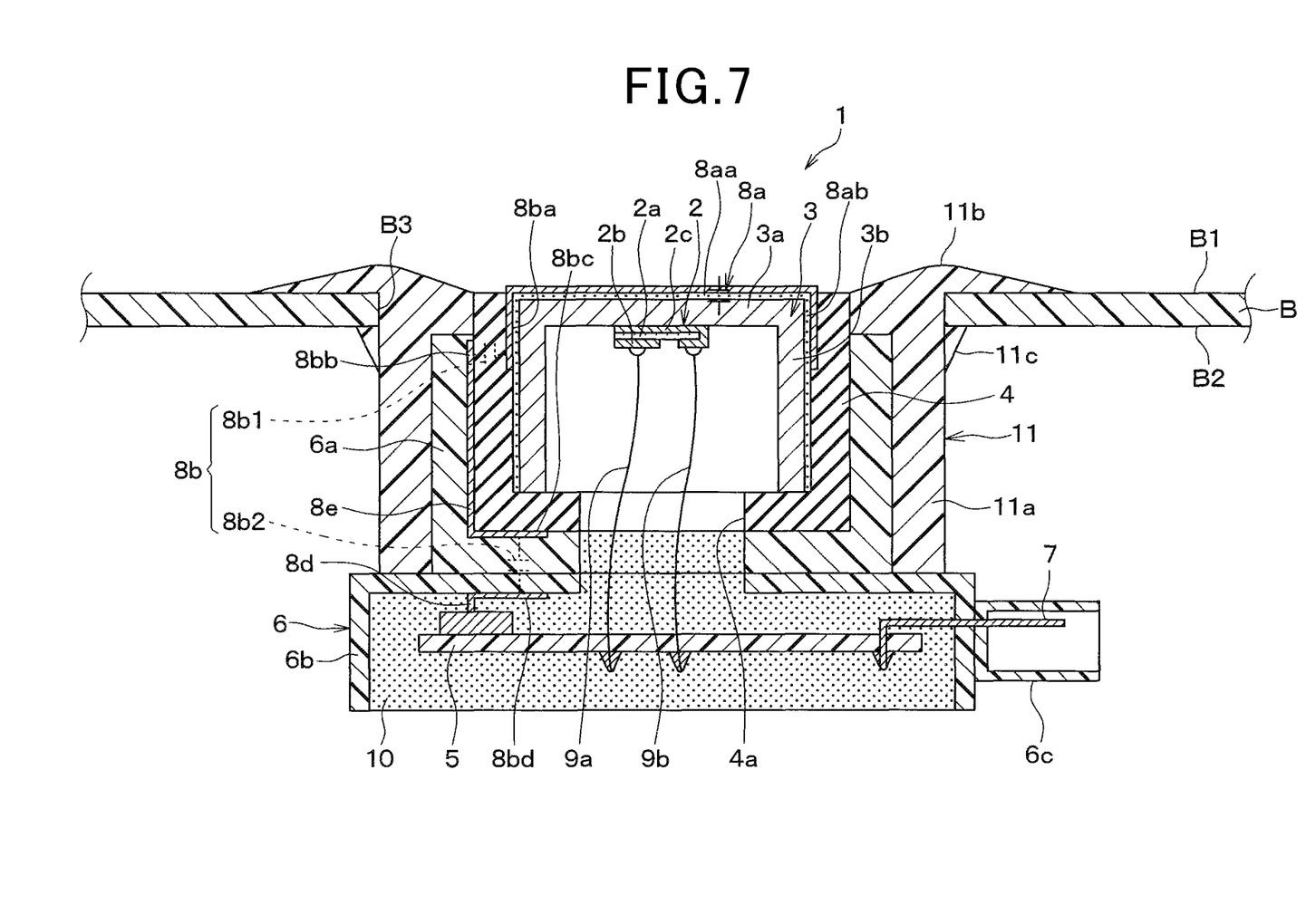
FIG. 7 is a sectional view of an ultrasonic sensor according to a second embodiment.

As illustrated in FIG. 7, in the present embodiment, a fixed capacitance 8*b* is formed of two fixed capacitances, a first fixed capacitance 8*b*1 and a second fixed capacitance 8*b*2 so that the two first fixed capacitance 8*b*1 and second fixed capacitance 8*b*2 are interposed between a sensor electrode 8*aa* and a circuit board 5.

Specifically, the first fixed capacitance 8*b*1 is formed by a first electrode 8*ba* and a second electrode 8*bb*, similarly to the first embodiment. The second fixed capacitance 8*b*2 is formed by a third electrode 8*bc* and a fourth electrode 8*bd*. The third electrode 8*bc* is disposed between a bottom of a cushion 4 and a bottom of a cylindrical portion 6*a* in a sensor case 6, and the second electrode 8*bb* is connected to the third electrode 8*bc* through wiring 8*e*. The fourth electrode 8*bd* is disposed facing the third electrode 8*bc*, on an inner wall surface of a housing portion 6*b* of the sensor case 6 in which the circuit board 5 is disposed. The fourth electrode 8*bd* is connected to the circuit board 5 via wiring 8*d*.

In this configuration, the fixed capacitance 8*b* is formed of the two first fixed capacitance 8*b*1 and second fixed capacitance 8*b*2, but is equivalent to being formed of the combined capacitance of these capacitances. Therefore, an adhesion sensor 8 of the present embodiment also has the same circuit configuration as in FIG. 3. Accordingly, the configuration of the present embodiment can also give the same effects as those in the first embodiment.

Further, configuring the fixed capacitance 8*b* to be formed of the two fixed capacitances as in the present embodiment makes it possible to design the shape and the installation structure for each of the first fixed capacitance 8*b*1 and the second fixed capacitance 8*b*2. Therefore, particularly when the cushion 4, the sensor case 6, or the like has a complicated shape, it is possible to simplify a step of attaching the fixed capacitance 8*b* or the shape of the fixed capacitance 8*b*, and thus to reduce costs.

Modified Example of Second Embodiment

When the fixed capacitance 8*b* is formed of the two first fixed capacitance 8*b*1 and second fixed capacitance 8*b*2 as in the second embodiment, the disposition locations of the first fixed capacitance 8*b*1 and the second fixed capacitance 8*b*2 can be changed as appropriate.

Figure 8:
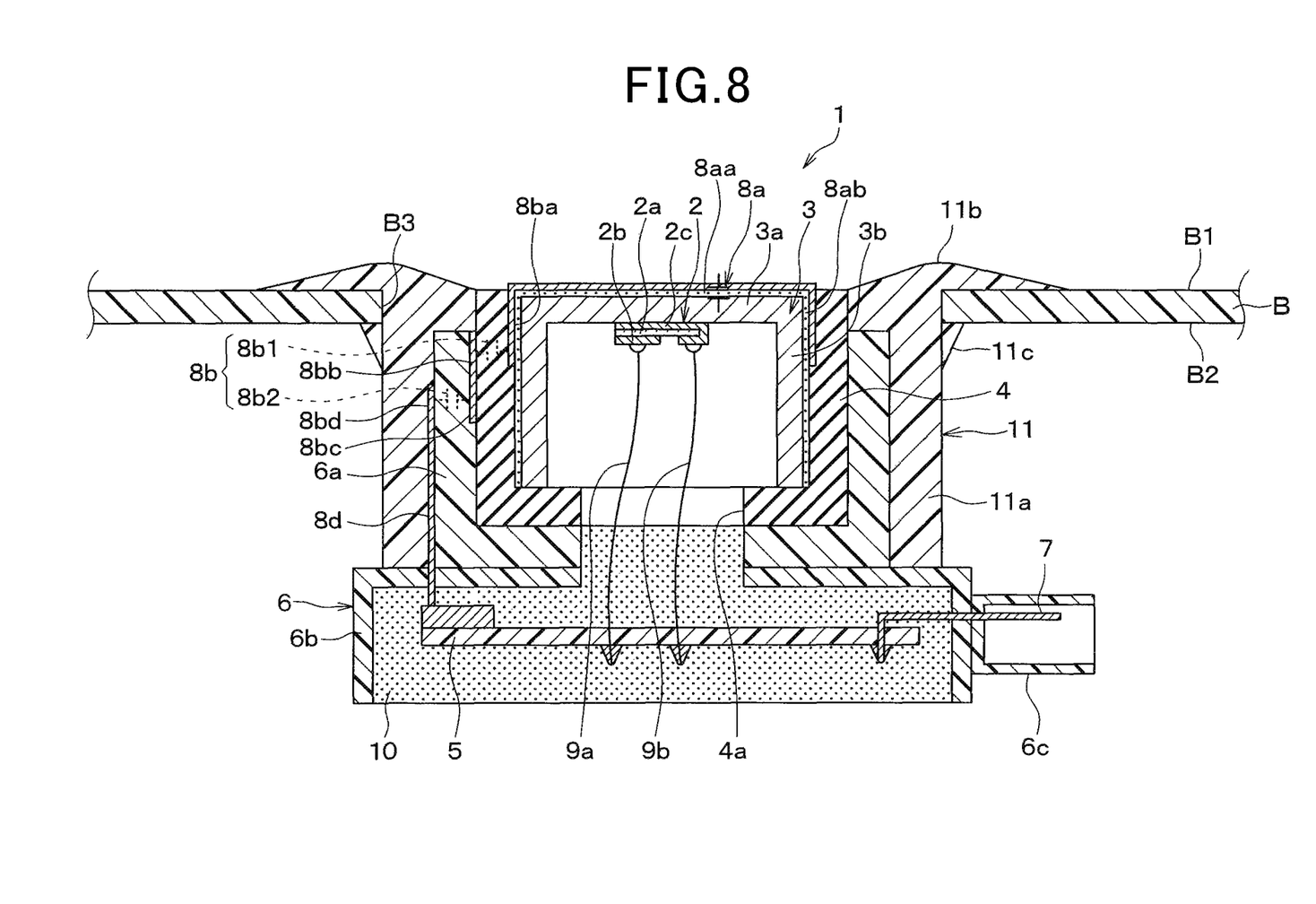
FIG. 8 is a sectional view of an ultrasonic sensor according to a modified example of the second embodiment.

For example, as illustrated in FIG. 8, the fourth electrode 8*bd* is disposed on an exterior of the cylindrical portion 6*a* of the sensor case 6 and faced with the third electrode 8*bc*. Further, the wiring 8*d* is led around along the cylindrical portion 6*a*, made through a wall surface of the housing portion 6*b* of the sensor case 6, and connected to the circuit board 5. This configuration also enables the fixed capacitance 8*b* to be formed of the two first fixed capacitance 8*b*1 and second fixed capacitance 8*b*2.

The fixed capacitance 8*b* is formed of the two first fixed capacitance 8*b*1 and second fixed capacitance 8*b*2 in the second embodiment, but may only be formed of a plurality of fixed capacitances, and may be formed of more than two fixed capacitances.

Third Embodiment

A third embodiment will be described. Also in the present embodiment, the configuration and the like of the fixed capacitance 8*b* are changed with respect to those of the first embodiment, but other features are the same as in the first embodiment. Therefore, only the parts different from those of the first embodiment are described.

Figure 9:
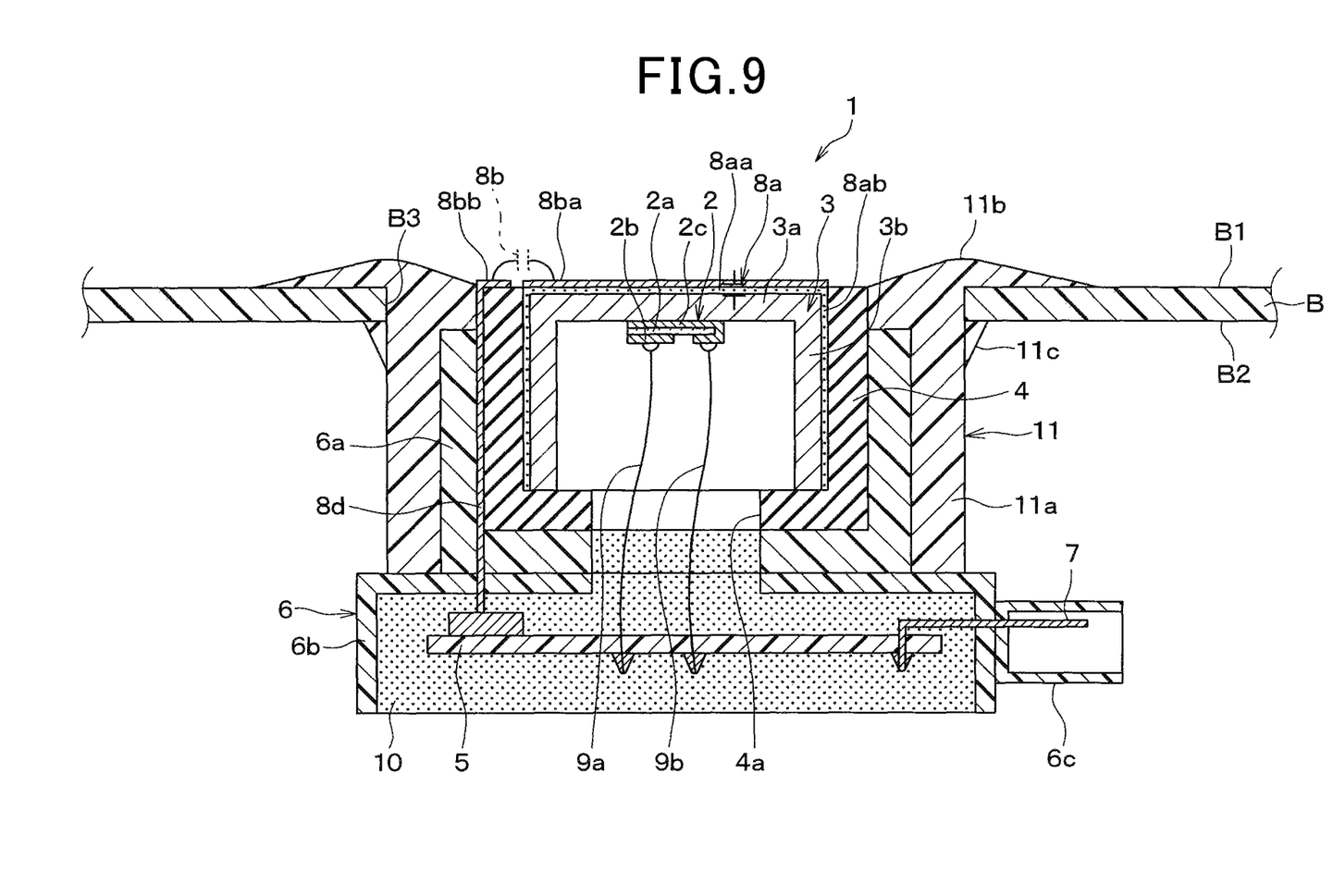
FIG. 9 is a sectional view of an ultrasonic sensor according to a third embodiment.

As illustrated in FIG. 9, in the present embodiment, a first electrode 8*ba* is disposed on a first surface of a bottom 3*a* of a microphone housing 3, a sensor electrode 8*aa* being disposed on the first surface of a bottom 3*a*. A distal end surface of a cushion 4, that is, an end surface of the cushion 4 on the side of the bottom 3*a* of the microphone housing 3 is made substantially coplanar with the first surface of the bottom 3*a*, and a second electrode 8*bb* is disposed on the distal end surface of the cushion 4. The first electrode 8*ba* and the second electrode 8*bb* can have any shape, but it is desirable that the first electrode 8*ba* is formed to be circular at the outer edge on first surface of the bottom 3*a* of the microphone housing 3 and the second electrode 8*bb* is formed to be circular on the distal end surface of the cushion 4.

Also in this manner, the fixed capacitance 8*b* can be formed, with the first electrode 8*ba* disposed substantially coplanar with and faced with the second electrode 8*bb*. This configuration in which the first electrode 8*ba* is not sandwiched between the cushion 4 and the microphone housing 3 does not generate constraint force between the microphone housing 3 and the cushion 4. Accordingly, this configuration can further reduce the influence on vibration properties of a vibration portion and enables further accurate obstacle detection. Also in the present embodiment, it is possible to suppress the variation in vibration properties by forming the first electrode 8*ba* at a position corresponding to a thick portion 3*bb*.

Fourth Embodiment

A fourth embodiment will be described. Also in the present embodiment, the configuration and the like of the fixed capacitance 8*b* are changed with respect to those of the first embodiment, but other features are the same as in the first embodiment. Therefore, only the parts different from those of the first embodiment are described.

Figure 10:
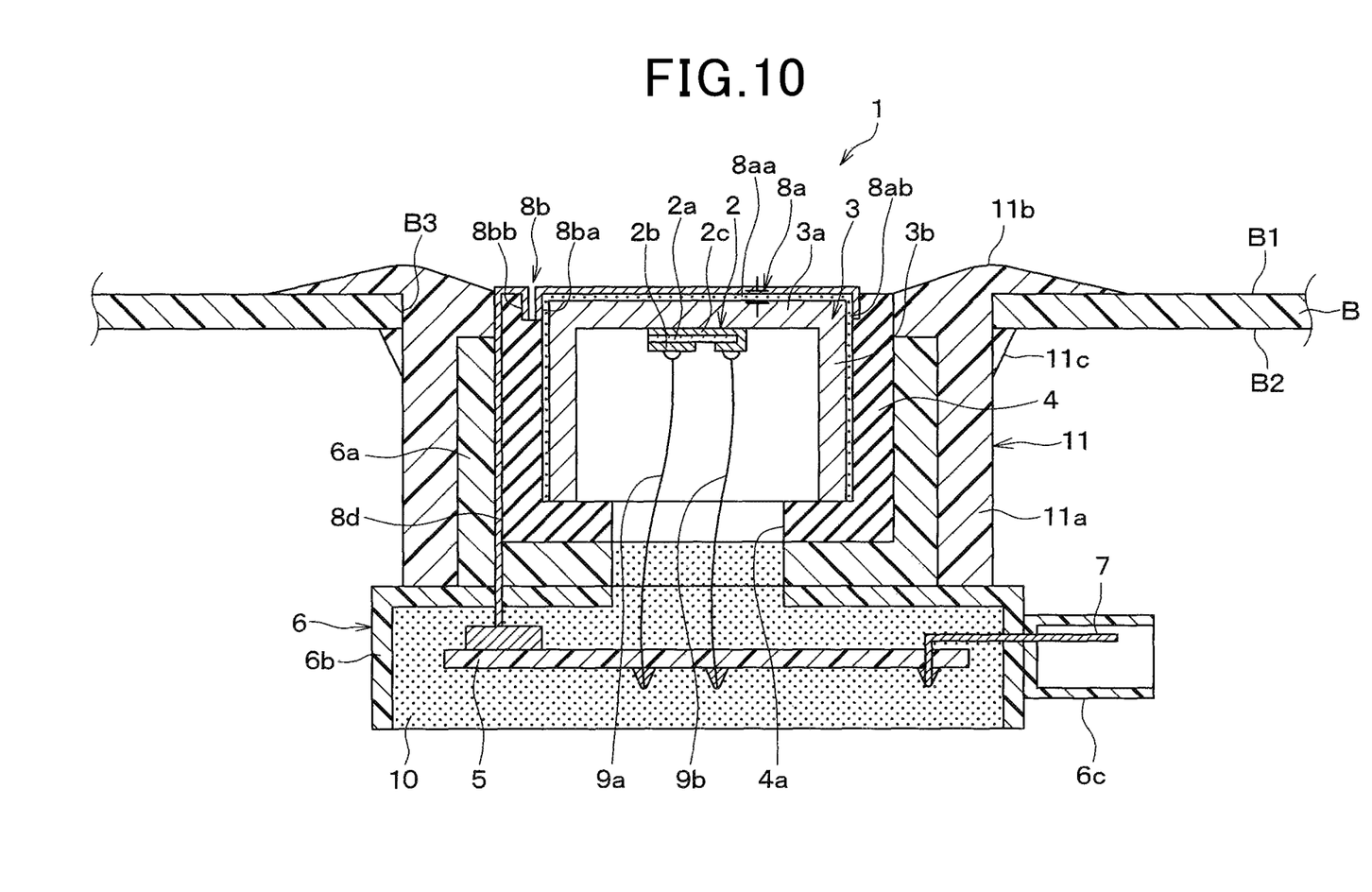
FIG. 10 is a sectional view of an ultrasonic sensor according to a fourth embodiment.

As illustrated in FIG. 10, in the present embodiment, a second electrode 8*bb* of a fixed capacitance 8*b* is disposed between a cushion 4 and a microphone housing 3, and wiring 8*d* is made to reach from a distal end surface to a side surface of the cushion 4 and pass through between the cushion 4 and a cylindrical portion 6*a*, and is connected to a circuit board 5.

A first electrode 8*ba* and the second electrode 8*bb* are disposed separate from each other, and a gap thus formed between the first electrode 8*ba* and the second electrode 8*bb* constitutes an air layer. For example, the cushion 4, which is made from a soft material, is deformed by the second electrode 8*bb* and the wiring 8*d* or is provided with a recess, so that the gap between the first electrode 8*ba* and the second electrode 8*bb* can be formed. Alternatively, a non-conductive film such as an insulating film or a dielectric film is formed on a surface of either one of the first electrode 8*ba* and the second electrode 8*bb*, and the first electrode 8*ba* and the second electrode 8*bb* are thereby configured to be disposed separate from each other, with the non-conductive film interposed therebetween.

In this configuration, the second electrode 8*bb* can be configured to be disposed between the cushion 4 and the microphone housing 3. In this case, a distance d between the first electrode 8*ba* and the second electrode 8*bb* can be made close to 0, and a capacitance value Ca of the fixed capacitance 8*b* can thus be increased and, for example, made greater than a capacitance value Csen of a variable capacitance 8*a*. In a series capacitor, the capacitance represented by the capacitance value Ca can be ignored by making the capacitance value Ca much greater than the capacitance value Csen. Therefore, the electrode disposition that achieves the capacitance value Ca much greater than the capacitance value Csen makes calibration of the capacitance value Ca unnecessary that is required due to attachment error during production, and enables reduction of production costs.

Fifth Embodiment

A fifth embodiment will be described. Also in the present embodiment, the configuration and the like of the fixed capacitance 8*b* are changed with respect to those of the first embodiment, but other features are the same as in the first embodiment. Therefore, only the parts different from those of the first embodiment are described.

Figure 11:
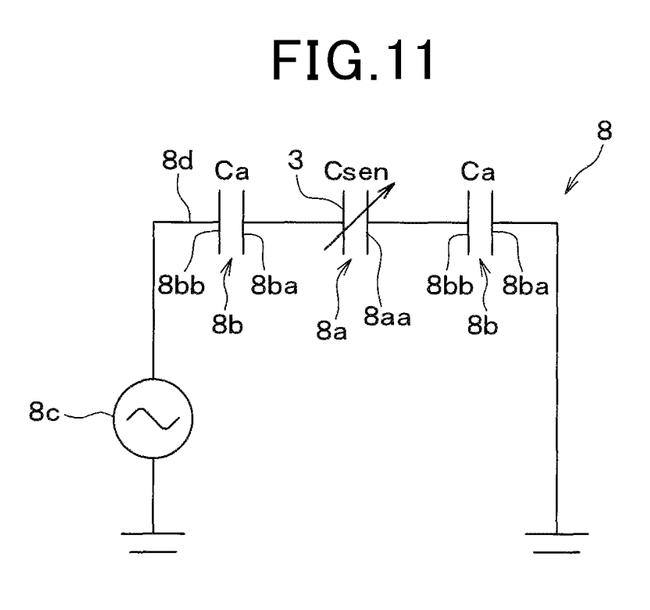
FIG. 11 is a circuit diagram of an adhesion sensor in an ultrasonic sensor according to a fifth embodiment.

In the configuration of the first embodiment, the fixed capacitance 8*b* is disposed between the variable capacitance 8*a* and the adhesion detecting section 8*c*, but a configuration may also be employed in which, in addition to the fixed capacitance 8*b*, a fixed capacitance 8*b* is disposed between the variable capacitance 8*a* and a ground potential point. A circuit configuration in this case is as illustrated in FIG. 11. For example, when two sensor electrodes 8*aa* are disposed facing each other on a surface of a bottom 3*a* and a variable capacitance 8*a* is thus formed, instead of forming the variable capacitance 8*a* between the sensor electrode 8*aa* and the microphone housing 3 as in the first embodiment and the like, the circuit configuration of FIG. 11 is easily achieved.

When a fixed capacitance 8*b* is provided between a variable capacitance 8*a* and a ground potential point, for example, a fixed capacitance 8*b* is provided that has the same configuration as that of the fixed capacitance 8*b* described in the first to fourth embodiments. Also as to wiring connected to the fixed capacitance, wiring having the same configuration as that of the wiring 8*d* is provided, and connected to a ground potential point of a circuit board 5 or the like. This configuration can also give the same effects as those in the first to fourth embodiments.

Other Embodiments

The present disclosure has been described along with the embodiments described above, but is not limited to the embodiments and encompasses various modified examples and modifications within the range of equivalents. In addition, various combinations and forms, and further, other combinations and forms obtained by adding thereto only one element, or more or less than one element are also within the scope and the spirit of the present disclosure.

For example, the configurations of components, such as the microphone 2, the microphone housing 3, and the sensor case 6, which constitute the ultrasonic sensor are only described as examples and can be changed as appropriate. For example, the microphone housing 3 has a bottomed cylindrical shape, but only has to have a bottomed tubular shape. Further, the embodiments described above are not unrelated to each other, but can be combined as appropriate, unless obvious contradictions arise. For example, when a plurality of fixed capacitances 8*b* are provided as in the second embodiment, one of the fixed capacitances 8*b* can be configured as in the third or fourth embodiment.

In the embodiments described above, the second electrode 8*bb* provided on the cushion 4 has been described as an example, but the second electrode 8*bb* only has to be configured to be provided on a member different from the microphone housing 3 so as not to directly propagate vibration from the vibration portion. In other words, another configuration may also be employed in which the second electrode 8*bb* is disposed facing the first electrode 8*ba*, with the cushion 4 interposed therebetween. For example, the second electrode 8*bb* may be provided on the sensor case 6, specifically, the second electrode 8*bb* may be provided on an inner peripheral surface or an outer peripheral surface of the cylindrical portion 6*a* at a site facing the first electrode 8*ba*. Alternatively, the second electrode 8*bb* may be provided on the mounting component 11 at a site facing the first electrode 8*ba*. Thus, it is also possible to provide the second electrode 8*bb* on an auxiliary component, such as the sensor case 6 or the mounting component 11, which is used for installing the microphone 2, the microphone housing 3, and the like on an object such as the bumper B. By providing the second electrode 8*bb* on such an auxiliary component, it is unnecessary to provide the second electrode 8*bb* as an individual component, and it is thus possible to reduce the number of steps for attachment and reduce costs. However, since the capacitance value Ca of the fixed capacitance 8*b* can be increased according as the second electrode 8*bb* is near to the first electrode 8*ba*, the second electrode 8*bb* is preferably provided on the cushion 4.

The bumper B has been described as an example of a body component serving as an object on which the ultrasonic sensor 1 is mounted, but the ultrasonic sensor 1 can be mounted on a body component other than the bumper B, such as a fender panel.

What is claimed is:

1. An ultrasonic sensor comprising:
a microphone that is formed of a piezoelectric vibration element, the piezoelectric vibration element converting an electrical signal into vibration and converting vibration into an electrical signal;
a microphone housing that has a bottomed tubular shape and includes a bottom including a first surface and a side wall, and houses the microphone, the bottom constituting a vibration portion having the microphone installed thereon; and
an adhesion sensor that detects adhesion of foreign matter to the first surface, wherein
the adhesion sensor includes:
a variable capacitance that includes a sensor electrode provided on the first surface and whose capacitance value changes in accordance with adhesion of foreign matter on the first surface;
a fixed capacitance that includes a first electrode connected to the sensor electrode, and a second electrode provided on a member different from the microphone housing and disposed facing the first electrode; and an adhesion detecting section that is connected to the sensor electrode via the fixed capacitance, and detects adhesion of foreign matter to the first surface by supplying an alternating-current signal to the fixed capacitance and the variable capacitance.

2. The ultrasonic sensor according to claim 1, further comprising:
a circuit board that is provided with the adhesion detecting section;
a sensor case that includes:
  a tubular portion that houses the microphone housing having the microphone installed therein, and
  a housing portion including a hollow in which the circuit board is housed,
  an interior of the tubular portion being in communication with the hollow of the housing portion; and
a cushion that is made from an elastic material and disposed between the microphone housing and the tubular portion, and serves as a buffer member that suppresses transmission of the vibration, wherein
the first electrode is disposed between the microphone housing and the cushion, and
the second electrode is disposed facing the first electrode, with the cushion interposed therebetween.

3. The ultrasonic sensor according to claim 1, further comprising:
a circuit board that is provided with the adhesion detecting section;
a sensor case that includes:
  a tubular portion that houses the microphone housing having the microphone installed therein, and
  a housing portion including a hollow in which the circuit board is housed,
  an interior of the tubular portion being in communication with the hollow of the housing portion; and
a cushion that is made from an elastic material and disposed between the microphone housing and the tubular portion, and serves as a buffer member that suppresses transmission of the vibration, wherein
the first electrode is disposed on the first surface of the bottom, and
the cushion further includes a distal end surface, the distal end surface being on a side of the bottom of the microphone housing, and the second electrode is disposed on the distal end surface of the cushion.

4. The ultrasonic sensor according to claim 1, comprising:
a circuit board that is provided with the adhesion detecting section;
a sensor case that includes:
  a tubular portion that houses the microphone housing having the microphone installed therein, and
  a housing portion that includes a hollow in which the circuit board is housed,
  an interior of the tubular portion being in communication with the hollow of the housing portion; and
a cushion that is made from an elastic material and disposed between the microphone housing and the tubular portion, and serves as a buffer member that suppresses transmission of the vibration, wherein
the first electrode and the second electrode are disposed separately from each other between the microphone housing and the cushion.

5. The ultrasonic sensor according to claim 1, wherein
the fixed capacitance includes, in addition to a first fixed capacitance formed by the first electrode and the second electrode, a second fixed capacitance formed by a third electrode and a fourth electrode disposed facing the third electrode.

6. The ultrasonic sensor according to claim 1, comprising:
a circuit board that is provided with the adhesion detecting section;
a sensor case that includes:
  a tubular portion that houses the microphone housing having the microphone installed therein, and
  a housing portion including a hollow in which the circuit board is housed,
  an interior of the tubular portion being in communication with the hollow of the housing portion; and
a cushion that is made from an elastic material and disposed between the microphone housing and the tubular portion, and serves as a buffer member that suppresses transmission of the vibration, wherein
the fixed capacitance includes, in addition to a first fixed capacitance formed by the first electrode and the second electrode, a second fixed capacitance formed by a third electrode and a fourth electrode disposed facing the third electrode,
the third electrode is connected to the second electrode and disposed between the cushion and the tubular portion, and
the fourth electrode is disposed on the sensor case.

7. The ultrasonic sensor according to claim 1, wherein
the side wall of the microphone housing includes a thin portion and a thick portion thicker than the thin portion, and
the first electrode is disposed at a position corresponding to the thick portion of the microphone housing.

8. The ultrasonic sensor according to claim 1, wherein
the second electrode is provided on an auxiliary component for mounting the microphone and the microphone housing on an object.

\* \* \* \* \*